(12) United States Patent
Addiego et al.

(10) Patent No.: US 8,658,551 B2
(45) Date of Patent: Feb. 25, 2014

(54) CREEP-RESISTANT ZIRCON ARTICLE AND METHOD OF MANUFACTURING SAME

(75) Inventors: William P. Addiego, Big Flats, NY (US); Michael J. Bennett, Corning, NY (US)

(73) Assignee: Corning Incorporated, Corning, NY (US)

( * ) Notice: Subject to any disclaimer, the term of this patent is extended or adjusted under 35 U.S.C. 154(b) by 336 days.

(21) Appl. No.: 13/206,005

(22) Filed: Aug. 9, 2011

(65) Prior Publication Data

US 2012/0047952 A1    Mar. 1, 2012

Related U.S. Application Data

(60) Provisional application No. 61/378,049, filed on Aug. 30, 2010.

(51) Int. Cl.
*C04B 35/482* (2006.01)

(52) U.S. Cl.
USPC ........................................ 501/106; 65/374.13

(58) Field of Classification Search
USPC ........................................ 501/106; 65/374.13
See application file for complete search history.

(56) References Cited

U.S. PATENT DOCUMENTS

| | | | |
|---|---|---|---|
| 3,338,696 A | 8/1967 | Dockerty | 65/145 |
| 3,682,699 A | 8/1972 | Koga et al. | 117/201 |
| 6,974,786 B2 * | 12/2005 | Helfinstine et al. | 501/106 |
| 7,238,635 B2 | 7/2007 | Ames et al. | 501/106 |
| 7,259,119 B2 * | 8/2007 | Helfinstine et al. | 501/106 |
| 7,414,001 B2 * | 8/2008 | Helfinstine et al. | 501/106 |
| 7,541,304 B2 * | 6/2009 | Helfinstine et al. | 501/106 |
| 7,696,115 B2 * | 4/2010 | Helfinstine et al. | 501/106 |
| 7,704,905 B2 * | 4/2010 | Addiego et al. | 501/106 |
| 7,932,200 B2 * | 4/2011 | Addiego et al. | 501/106 |
| 2005/0130830 A1 * | 6/2005 | Ames et al. | 501/103 |
| 2006/0094585 A1 * | 5/2006 | Helfinstine et al. | 501/106 |
| 2007/0142207 A1 * | 6/2007 | Helfinstine et al. | 501/106 |
| 2008/0125307 A1 | 5/2008 | Lu et al. | 501/103 |
| 2008/0139377 A1 * | 6/2008 | Helfinstine et al. | 501/106 |
| 2008/0196449 A1 | 8/2008 | Addiego et al. | 65/17.3 |
| 2008/0277835 A1 | 11/2008 | Addiego et al. | 264/405 |
| 2009/0272482 A1 | 11/2009 | Addiego et al. | 156/89.28 |
| 2010/0125034 A1 * | 5/2010 | Addiego et al. | 501/106 |
| 2010/0248934 A1 * | 9/2010 | Addiego et al. | 501/106 |
| 2012/0047952 A1 * | 3/2012 | Addiego et al. | 65/90 |

FOREIGN PATENT DOCUMENTS

WO    2009/142695    11/2009

OTHER PUBLICATIONS

A. Assifaoui, et al , "Grain growth of zircon pigment in tile glaze", British Ceramic Transactions, 2003, vol. 102, No. 2, pp. 5760.
M. Sugai, et al., "Effects of Grain Size on Reaction and Sintering Between Zircon and Titania", Bulletin of the Tokyo Institute of Technology, 1975, No. 126, pp. 45-57.
K.C. Goretta et al., Compressive creep of polycrystalline $ZrSiO_4$, *Journal of the European Ceramic Society*, 2001, vol. 21, pp. 1055-1066.

* cited by examiner

*Primary Examiner* — Karl Group
(74) *Attorney, Agent, or Firm* — Thomas R. Beall

(57) ABSTRACT

A creep-resistant zircon article and a method of manufacturing the creep-resistant zircon article are described herein. In one example, the creep-resistant zircon article has the shape of a forming apparatus (e.g., isopipe) which is used in the fusion process to manufacture glass sheets.

5 Claims, 2 Drawing Sheets

CREEP-RESISTANT ZIRCON ARTICLE AND METHOD OF MANUFACTURING SAME

CLAIM OF PRIORITY

This application claims the benefit of priority under 35 U.S.C. §119 of U.S. Provisional Application Ser. No. 61/378,049 filed on Aug. 30, 2010. The contents of this document are hereby incorporated by reference herein.

TECHNICAL FIELD

The present invention relates in general to a refractory ceramic material and, in particular, to a creep-resistant zircon article and a method of manufacturing the creep-resistant zircon article. In one embodiment, the creep-resistant zircon article has the shape of a forming apparatus (e.g., isopipe) which is used in the fusion process to manufacture glass sheets.

BACKGROUND

The fusion process (e.g., downdraw process) is one of the basic techniques used to produce high quality thin glass sheets which can be used in a variety of devices like liquid crystal displays (LCDs). The fusion process is the preferred technique for producing glass sheets used in devices such as liquid crystal displays because this process produces glass sheets whose surfaces have superior flatness and smoothness when compared to glass sheets produced by other methods. The fusion process is described in U.S. Pat. Nos. 3,338,696 and 3,682,609, the contents of which are incorporated herein by reference.

The fusion process makes use of a specially shaped refractory block referred to as an isopipe (e.g., forming apparatus) over which molten glass flows down both sides and meets at the bottom to form a single glass sheet. Although the isopipe generally works well to form a glass sheet, the isopipe is long compared to its cross section and as such can creep or sag over time due to the load and to the high temperature associated with the fusion process. When the isopipe creeps or sags too much it becomes very difficult to control the quality and thickness of the glass sheet. This can be particularly troublesome when making wide glass sheets equal to or greater than Gen 10 (or 157-inch isopipe length) where it is important to ensure the uniform dimension of the glass sheet while it is being drawn in the manufacturing process. One way this problem can be addressed is by modifying the elements used to make the isopipe in a way that changes its physical properties in a direction that improves its resistance to creep.

Corning Inc. has developed several methods to improve the creep resistance of zircon which is the current material used to make the isopipe that is used to form LCD glass. These methods all relate to making a creep-resistant isopipe by mixing and homogenizing powdered zircon particles which have specific size distributions and by adding titania and yttria to the mixed zircon particles. The titania and yttria improve the grain growth of zircon by increasing the zircon grain size and decreasing the zircon grain boundary concentration in the fired isostatically pressed zircon isopipe. A detailed discussion of these different methods can be found in the following co-assigned patent applications: (1) US Patent Application No. 2008/0196449 A1; (2) US 2008/0277835 A1; (3) US 2009/0272482; and (4) PCT WO 2009/142695 A2. The contents of these documents are incorporated by reference herein. Although all of these methods work well in improving the creep resistance of the zircon isopipe there is still a desire to manufacture an improved creep-resistant zircon isopipe and this need and other needs have been satisfied by the present invention.

SUMMARY

A manufacturing method and a creep-resistant zircon article (isopipe) are described in the independent claims of the present application. Advantageous embodiments are described in the dependent claims.

In one aspect, the present invention provides a method for manufacturing a creep-resistant zircon article. The method includes the steps of: (a) providing a zircon article that includes at least fine zircon particles with a size <5 µm, coarse zircon particles with a median size in a range of 5 µm-100 µm, and a thermal decomposition promoter; (b) promoting a thermal decomposition of the zircon article where the fine zircon particles decompose faster and to a greater extent than the coarse zircon particles; and (c) recrystallizing the thermally decomposed fine zircon particles onto the coarse zircon particles that had not decomposed during the thermal decomposition promoting step to form the creep-resistant zircon article. In one embodiment, the thermal decomposition promoting step includes heating the zircon article to >1580° C. for more than 6 hours. Plus, the recrystallization step includes cooling the heated zircon article at about <2° C./hr to about 1500° C.

In another aspect, the present invention provides a creep-resistant zircon article including a zircon article that prior to a thermal decomposition and recrystallization process included at least fine zircon particles with a size <5 µm, coarse zircon particles with a median size in a range of 5 µm-100 µm, and a thermal decomposition promoter and after the thermal decomposition and recrystallization process the zircon article has a strain rate/hr of $\ll 2.2 \times 10^{-7}$/hr measured at 1180° C. under 1,000 psi. In one embodiment, the zircon article can have a more preferred strain rate/hr of $\ll 1 \times 10^{-7}$/hr measured at 1180° C. under 1,000 psi.

In yet another aspect, the present invention provides a glass manufacturing system including: (a) at least one vessel configured to provide a molten glass; (b) a forming apparatus configured to receive the molten glass and form a glass ribbon, where the forming apparatus is made at least in part from a creep-resistant zircon article that has a strain rate/hr of $\ll 2.2 \times 10^{-7}$/hr measured at 1180° C. under 1,000 psi; and (c) a pull roll assembly configured to receive and draw the glass ribbon to form a glass sheet. In one embodiment, the creep-resistant zircon article can have a more preferred strain rate/hr of $\ll 1 \times 10^{-7}$/hr measured at 1180° C. under 1,000 psi.

In still yet another aspect, the present invention provides a forming apparatus for receiving molten glass and forming a glass ribbon. The forming apparatus includes a body having an inlet that receives the molten glass, where the molten glass flows into a trough formed in the body and then overflows two top surfaces of the trough and runs down two sides of the body before fusing together where the two sides of the body come together to form the glass ribbon, and where the body is made from a creep-resistant zircon article that has a strain rate/hr of $\ll 2.2 \times 10^{-7}$/hr measured at 1180° C. under 1,000 psi. In one embodiment, the creep-resistant zircon article can have a more preferred strain rate/hr of $\ll 1 \times 10^{-7}$/hr measured at 1180° C. under 1,000 psi.

Additional aspects of the present solution will be set forth, in part, in the detailed description, figures and any claims which follow, and in part will be derived from the detailed description, or can be learned by practice of the present solution. It is to be understood that both the foregoing general description and the following detailed description are exemplary and explanatory only and are not restrictive of the present solution as disclosed.

BRIEF DESCRIPTION OF THE DRAWINGS

A more complete understanding of the present solution may be had by reference to the following detailed description when taken in conjunction with the accompanying drawings wherein.

DETAILED DESCRIPTION

Figure 1:
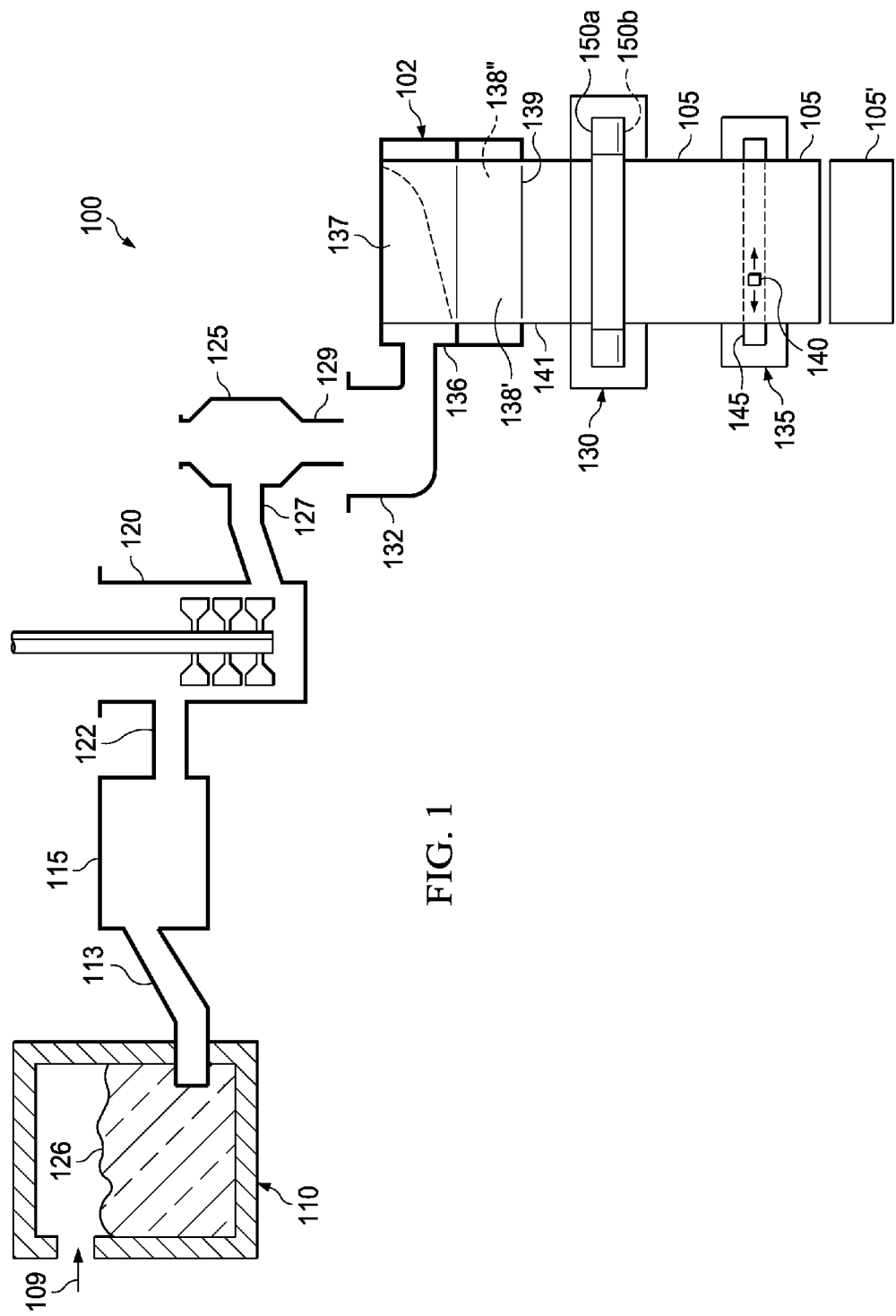
FIG. 1 is a schematic view of an exemplary glass manufacturing system which uses a fusion draw process and an improved exemplary creep-resistant zircon isopipe to manufacture a glass sheet in accordance with an embodiment of the present invention.

Referring to FIG. 1, there is shown a schematic view of an exemplary glass manufacturing system 100 that uses a fusion draw process and an improved creep-resistant zircon isopipe 102 to manufacture a glass sheet 105' in accordance with an embodiment of the present invention. As shown, the exemplary glass manufacturing system 100 includes a melting vessel 110, a fining vessel 115, a mixing vessel 120 (e.g., stir chamber 120), a delivery vessel 125 (e.g., bowl 125), the creep-resistant zircon isopipe 102 (forming apparatus 102, vertical glass delivery device 102), a pull roll assembly 130, and a glass sheet separation device 135.

The melting vessel 110 is where glass batch materials are introduced as shown by arrow 109 and melted to form molten glass 126. The fining vessel 115 (e.g., finer tube 115) has a high temperature processing area that receives the molten glass 126 (not shown at this point) via a refractory tube 113 from the melting vessel 110 and in which bubbles are removed from the molten glass 126. The fining vessel 115 is connected to the mixing vessel 120 (e.g., stir chamber 120) by a finer to stir chamber connecting tube 122. The mixing vessel 120 is connected to the delivery vessel 125 by a stir chamber to bowl connecting tube 127. The delivery vessel 125 delivers the molten glass 126 through a downcomer 129 to an inlet 132 and into the isopipe 102.

The isopipe 102 includes an inlet 136 that receives the molten glass 126 which flows into a trough 137 and then overflows and runs down two sides 138' and 138" before fusing together at what is known as a root 139. The root 139 is where the two sides 138' and 138" come together and where the two overflow walls of the molten glass 126 rejoin (e.g., refuse) to form a glass ribbon 141 (see FIG. 2).

The glass ribbon 141 is subsequently drawn downward between two rolling rolls 150a and 150b in the pull roll assembly 130 to form the glass sheet 105. Then, the glass sheet separation device 135 (optional) which may have a mechanical scoring device 140 (e.g., scoring wheel 140) and a nosing device 145 is used to mechanically score the glass sheet 105 so it can be separated into distinct pieces of glass sheets 105'. A detailed discussion about the new and improved exemplary creep-resistant isopipe 102 is provided next with respect to FIG. 2.

Figure 2:
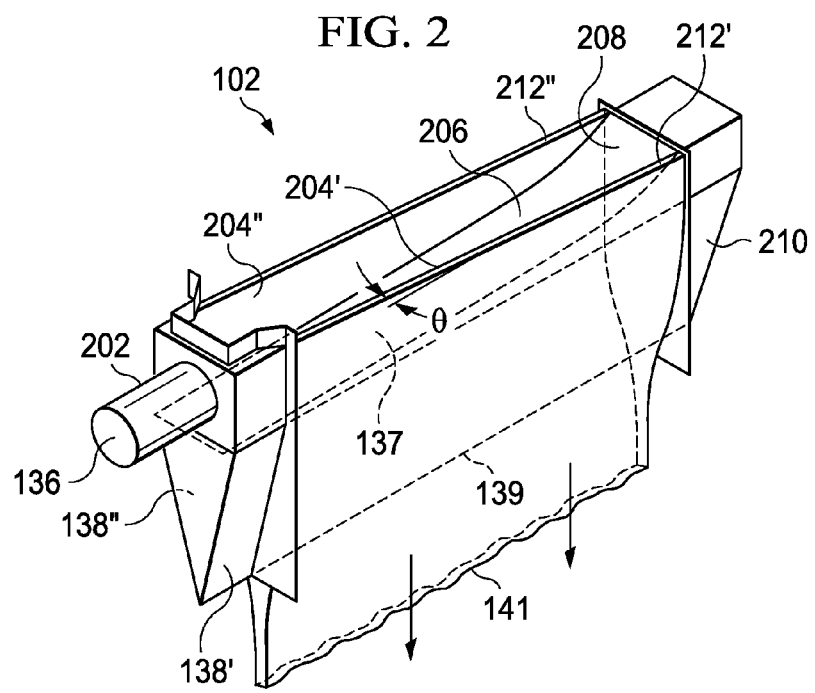
FIG. 2 is a perspective view illustrating in greater detail the improved creep-resistant zircon isopipe shown in FIG. 1 in accordance with an embodiment of the present invention.

Referring to FIG. 2, there is shown a perspective view of the exemplary creep-resistant isopipe 102 in accordance with an embodiment of the present invention. The creep-resistant isopipe 102 includes a feed pipe 202 that provides the molten glass 126 through the inlet 136 to the trough 137. The trough 137 is bounded by interior side-walls 204' and 204" that are shown to have a substantially perpendicular relationship but could have any type of relationship to a bottom surface 206. In this example, the isopipe 102 has a bottom surface 206 which has a sharp decreasing height contour near the end 208 farthest from the inlet 136. If desired, the isopipe 102 can have a bottom surface 206 which has located thereon an embedded object-plow (not shown) near the end 208 farthest from the inlet 136. Alternatively, the isopipe 102 may be equipped with edge directors (not shown) located on both sides thereof.

The isopipe 102 has a cuneiform shaped body 210 (wedged shaped body 210) with the oppositely disposed converging side-walls 138' and 138". The trough 137 having the bottom surface 206 and possibly the embedded object (not shown) is longitudinally located on the upper surface of the wedge-shaped body 210. The bottom surface 206 and embedded object (if used) both have mathematically described patterns that become shallow at end 208 which is the end the farthest from the inlet 136. As shown, the height between the bottom surface 206 and the top surfaces 212' and 212" of the trough 137 decreases as one moves away from the inlet 136 towards the end 208. However, the height of the trough 137 can vary in any manner between the bottom surface 206 and the top surfaces 212' and 212". If desired, the cuneiform shaped body 210 may be pivotally adjusted by a device such as an adjustable roller, wedge, cam or other device (not shown) to provide a desired tilt angle shown as $\theta$ which is the angular variation from the horizontal of the parallel top surfaces 212' and 212".

The isopipe 102 forms the glass ribbon 141 which has smooth pristine surfaces by enabling the molten glass 126 to enter the trough 137 through the feed pipe 202 and inlet 136. The molten glass 126 then wells over the parallel top surfaces 212' and 212" of the trough 137, divides, and flows down each side of the oppositely disposed converging sidewalls 138' and 138" of the wedge-shaped body 210. At the bottom of the wedge portion or the root 139, the divided molten glass 126 rejoins to form the glass ribbon 141 which has very flat and smooth pristine surfaces. The high surface quality of the glass ribbon 141 results from a free surface of the molten glass 126 that divides and flows down the oppositely disposed converging side-walls 138' and 138" and forms the exterior surfaces of the glass ribbon 141 without coming into contact with the outside of the isopipe 112. A detailed discussion is provided next about the composition of the creep-resistant isopipe 102 and the counter-intuitive manufacturing process used to make the new and improved creep-resistant isopipe 102.

In the past, the zircon which is the material used to make the isopipe 102 was typically fired near or below 1580° C. for 6-24 hours because higher temperatures would promote the decomposition of zircon, zirconium silicate, into silica, usually as a cristobalite crystal phase, and into zirconia, usually as tetragonal and monoclinic phases. This thermal decomposition was not desirable because such phase changes could compromise the mechanical integrity of the isopipe 102, and some of the material could contaminate the molten glass. As a result, this thermal decomposition was avoided by adding additives (e.g., titania, yttria) to the zircon batch and by using firing temperatures which did not promote the decomposition. However, in the present invention the new manufacturing process actually seeks to promote the decomposition of zircon by firing at high temperatures that are greater than 1580° C. for a long period of time in the range of 6-48 hours or greater. Plus, the new manufacturing process incorporates the additives, such as titania, where in the presence of this high firing temperature causes the zircon to form a glass liquid phase including zirconia, silica and zirconium titanate then upon a slow cooling process at about <2° C./hr to about 1500° C. results in the re-crystallization of the zircon and Ostwald ripening. The cooling rate can be increased below 1500° C.

Ostwald ripening is a phenomenon whereby crystal growth occurs by large crystals growing at the expense and consumption of smaller crystals of a given species. More specifically, Ostwald ripening is a thermodynamically driven process that lowers the overall energy state of the system. When a phase precipitates, it will do so in an energetically favorable way by growing onto existing larger particles. In the present invention, Ostwald ripening is promoted by the presence of very small zircon particles that decompose during the firing process at a faster rate and to a greater extent than the larger, bulkier zircon particles and react to form an eutectic with titania (or other suitable promoter). Upon the slow cooling process, devitrification and precipitation occur in the glass liquid phase such that the decomposed zircon re-crystallizes on the large zircon particles that had not decomposed fast enough. Hence, this manufacturing process promotes the growth of zircon crystals by decreasing the zircon grain boundary concentration and by decreasing the concentration of smaller zircon particles and promoting the growth of larger zircon particles. In particular, the new manufacturing process results in larger zircon crystals (grains) and lower grain boundary concentrations in the zircon article which yields lower creep under stress at high temperatures.

The manufacturing process may start by preparing a zircon batch that has a composition including at least fine zircon particles with a size <5 μm, coarse zircon particles with a median size in a range of 5 μm-100 μm, and a thermal decomposition promoter such as titania. In particular, the composition can include an easily decomposable zircon (A) with a median size of <5 um, preferably <3 um, more preferably 1 um, and even more preferably <1 um, with the balance of the zircon component (B) including zircon with a median size >5 um to no greater than 100 um. Component (B) can, itself, include a mixture of zircon powders with distinct particle size distributions, and that the net median size of any mixture falls within the range specified for component (B).

In one application, the total zircon components (A) and (B) could be described as a ternary composition of zircon components in the form of a powder with a median size defined as component A and two other zircon powders that together would be defined as component B. The concentration of component A could be 1 wt % to 40 wt % and then the balance of the zircon components of component B would be 99 wt % to 60 wt %, respectively. As an example, a ternary mixture of zircon powders can be: (1) 30 wt % component (A)-30 wt % zircon with median size of 1 um; and (2) 70 wt % component (B)-50 wt % zircon with median size of 20 um and 50% zircon with median size of 7 um. In this ternary zircon mixture there would be 30 wt % 1 um; 35 wt % 20 um; and 35% 7 um. As another example, the ternary composition may have a preferred median size from coarse to fine zircon particles of 30-10 um/10-5 um/<5 um with a corresponding wt % in batch of 40-20 wt %/40-30 wt %/20-50 wt %. In another example, the ternary composition may have a more preferred median size from coarse to fine zircon particles of 20-10 um/10-5 um/<3 um with a corresponding wt % in batch of 35-20 wt %/35-30 wt %/30-50 wt %. In all of these examples, the titania particle size should be <10 um, preferably <5 um, and most preferably <1 um, and as a concentration of >0.2-2 wt % mixed with zircon or >2 wt %.

In another application, the total zircon components (A) and (B) could be described as a quaternary composition of zircon components in the form of a powder with a median size defined as component A and three other zircon powders that together would be defined as component B. In one example, the quaternary composition may have a preferred median size from coarse to fine zircon particles of 60-40 um/30-10 um/10-5 um/<5 um with a corresponding wt % in batch of 1-10 wt %/10-30 wt %/20-10 wt %/69-50 wt %. In another example, the quaternary composition may have a more preferred median size from coarse to fine zircon particles of 50-40 um/20-10 um/10-5 um/<3 um with a corresponding wt % in batch of 1-5 wt %/20-30 wt %/10-25 wt %/69-40 wt %. In all of these examples, the titania particle size should be <10 um, preferably <5 um, and most preferably <1 um, and as a concentration of >0.2-2 wt % mixed with zircon or >2 wt %.

In any case, the zircon batch can be made by placing zircon particles in a milling system that mills and shear-mixes the zircon particles with a liquid such as water or alcohol that generates the desired particle size distribution with the desired size range. Or, the zircon batch can be made by dry-mixing previously milled zircon particles in a turbula or other mixer and then shear-mixed to ensure uniformity either as a prepared slurry (which is subsequently dried) or as a dry powder. Thereafter, the powder can be dry-mixed with an organic binder, optionally, such as an acrylic latex, other polymer, starch, or other organic.

The manufacturing process may also include a step of pressing the powdered zircon batch to form a zircon article. For instance, the pressing operation can involve loading the powder into a rubber (or similar) bag and placing the bag on a vibration platform or a similar device to vibrate the bag and powder to ensure maximum powder settling. After vibrating the bag, it is topped with a porous wadding, such as cotton or cloth, and the bag is evacuated to a pressure <<1 atmosphere (e.g., <500 millitorr) and then sealed. The sealed bag is then placed in an isostatic press, submerged in hydraulic fluid for the purpose of isopressing. The isostatic press then presses the submerged bag to >10,000 psi (e.g., 15,000-20,000 psi) for 1-5 minutes and possibly >10 minutes depending on the size of the final product and other conditions. After the desired pressing time, the isostatic press reduces the pressure and the bag is removed and then the green zircon article is removed from the bag.

Alternatively, the manufacturing process could bypass the mixing step and the pressing step and instead provide a previously fired isopipe 102 (possibly previously used in production) which has composition as described above including at least fine zircon particles with a size <5 μm, coarse zircon particles with a median size in a range of 5 μm-100 μm, and a thermal decomposition promoter such as titania.

The manufacturing process further includes a step of promoting the thermal decomposition of the zircon article where the fine zircon particles decompose faster and to a greater extent than the coarse zircon particles. The thermal decomposition promoting step includes heating the zircon article to >1580° C. for 6-48 hours or greater. For instance, the zircon article can be heated to anyone of the following temperatures: about 1580° C.-1585° C.; about 1585° C.-1590° C.; about 1590° C.-1595° C.; about 1595° C.-1600° C.; about 1600° C.-1605° C.; and about 1605° C.-1610° C. The heated zircon article would be held at one of those temperatures for anyone of the following time periods: 6 hours, 7 hours; 8 hours; 9 hours; 10 hours; 11 hours; 12 hours; 13 hours; 14 hours; 15 hours; 16 hours; 17 hours; 18 hours; 19 hours; 20 hours; 21 hours; 22 hours; 23 hours; 24 hours; 25 hours; 26 hours; 27 hours; 28 hours; 29 hours; 30 hours; 31 hours; 32 hours; 33 hours; 34 hours; 35 hours; 36 hours; 37 hours; 38 hours; 39 hours; 40 hours; 41 hours; 42 hours; 43 hours; 44 hours; 45 hours; 46 hours; 47 hours; 48 hours, or longer.

The manufacturing process further includes a step of recrystallizing the thermally decomposed fine zircon particles onto the coarse zircon particles that had not decomposed during the thermal decomposition promoting step to form the creep-resistant zircon article. In one example, the creep-resistant zircon article can have a strain rate/hr of 8-11×$10^{-8}$/hr measured at 1180° C. under 1,000 psi. Or, the creep-resistant zircon article may have a more preferred strain rate/hr of 5-7×$10^{-8}$/hr measured at 1180° C. under 1,000 psi. The recrystallizing step includes cooling the heated zircon article at about <2° C./hr to about 1500° C. For instance, the heated zircon article can be cooled to about 1500° C. by anyone of the following cooling rates: 2° C./hour; 3° C./hour; 4° C./hour; 5° C./hour; 6° C./hour; 7° C./hour; and 8° C./hour. The cooling rate can be increased below 1500° C. Thereafter, the fired zircon article is milled to the desired shape and size which in this example is the isopipe 102.

The inventors have conducted several experiments to compare zircon articles made in accordance with the manufacturing process discussed in the background section and zircon articles made by the improved manufacturing process in accordance with the present invention. In the improved manufacturing process, the firing temperature was increased from 1580° C. to either 1600 or 1610° C. The firing time was extended from 24 hr to 48 hr. The cool-down rate from the firing temperature to 1500° C. was decreased from 8° C./hr to 2° C./hr. The results of one experiment are shown below in TABLE #1 as follows:

302 has a denser microstructure (larger zircon grains and lower grain boundary concentrations) than the microstructure of the old zircon article 300. Thus, the new zircon article 302 has a lower creep under stress at high temperatures than the old zircon article 300.

The results of another experiment are shown below in TABLE #2 where several exemplary zircon articles made in accordance with the new manufacturing process are compared to an existing LCZ product and an existing Atlas product. Under all these tested temperatures, up to 1300° C., the fired zircon articles with sample IDs 355-51 and 355-54LB made by the new manufacturing process had an improved strain rate when compared to the LCZ product and the Atlas product.

TABLE #2

| Sample ID | Stress (psi) | Temp. (° C.) | Strain Rate (/hr) |
| --- | --- | --- | --- |
| 355-51 | 1000 | 1299 | 9.41E−06 |
| 72 B Atlas | 1000 | 1299 | 3.69E−05 |
| LCZ-3EZ | 1000 | 1299 | 1.54E−05 |
| LCZ Blank 2 | 1000 | 1299 | 1.78E−05 |
| 355-51 | 1000 | 1250 | 1.21E−06 |
| 355-54LB | 1000 | 1250 | 1.09E−06 |
| 355-54LB | 250 | 1300 | 8.50E−07 |
| 355-51 | 250 | 1300 | 1.17E−06 |
| LCZ Blank 3 | 250 | 1300 | 2.58E−06 |
| LCZ Blank 3 | 250 | 1300 | 2.65E−06 |

The results of the experiment shown in TABLE #2 indicate a marked improvement in creep resistance when testing the zircon articles made using the improved manufacturing process. For instance, the new zircon article had a strain rate of

TABLE #1

| Particle sizes and % | Original or High-temp | Sample ID | Top temperature/ Soak/Cooling | Fired density (g/cc) | Strain rate (/hr) @ 1180 C. | Strain rate (/hr) @ 1250 C. | MOR (psi) |
| --- | --- | --- | --- | --- | --- | --- | --- |
| 49 um/20 um/7 um/1 um in wt %'s of 5/30/25/40 + 0.8% titania rutile and 1.0% Yttria | Original composition | 355-49 | 1580 C./24 hrs/8 C. per hr to 1500 C. | 4.20 | 2.23E−07 (average of 2) | No Data | 12,703.7 |
| | High-temp/ slow cool | 355-111 | 1600 C./48 hrs/2 C. per hr to 1500 C. | 4.27 | 7.15E−08 | 8.98E−07 | 14,842.8 |
| | counterpart | 355-111 | 1610 C./48 hrs/2 C. per hr to 1500 C. | 4.26 | 5.48E−08 | 8.72E−07 | 14,267.7 |
| 20 um/7 um/1 um in wt %'s of 35/35/30 + 0.8% titania rutile and 1.0% Yttria | Original composition | 355-63 | 1580 C./48 hrs/8 C. per hr to 1500 C. | 4.18 | 2.92E−07 | No Data | 13,511.3 |
| | High-temp/ slow cool | 355-110 | 1600 C./48 hrs/2 C. per hr to 1500 C. | 4.21 | 6.75E−08 | 8.08E−07 | 12,843.2 |
| | counterpart | 355-110 | 1610 C./48 hrs/2 C. per hr to 1500 C. | 4.26 | 6.65E−08 | 9.72E−07 | 12,721.1 |

The results of the experiment shown in TABLE #1 indicate a marked improvement in creep resistance when testing the zircon articles made using the improved manufacturing process. For instance, the new zircon article had a strain rate of <7.15×$10^{-8}$/hr measured at 1180° C. under 1,000 psi where the old zircon article had a strain rate of 2.23×$10^{-7}$/hr measured at 1180° C. under 1,000 psi. Even when these fired zircon articles where strain tested at much higher temperatures, such as 1250° C., the creep was still very low when compared to the zircon articles made by the known manufacturing process. For instance, the new zircon article had a strain rate of <9.72×$10^{7}$/hr measured at 1250° C. under 1,000 psi.

Figure 3A:
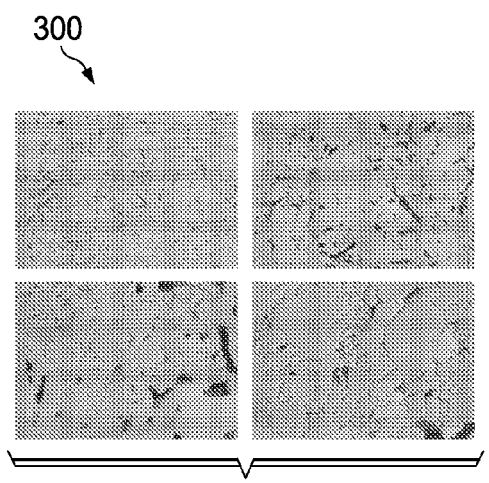
FIGS. 3A and 3B are scanning electronic microscope (SEM) images illustrating the microstructure of a known creep-resistant zircon article (FIG. 3A) and an improved exemplary creep-resistant zircon (FIG. 3B) in accordance with an embodiment of the present invention.
Figure 3B:
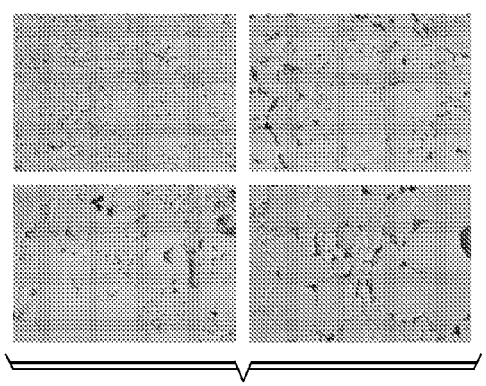

Referring to FIGS. 3A and 3B, there are SEM images of the zircon article 300 with sample ID 355-49 (FIG. 3A—Prior Art) and the zircon article 302 with sample ID 355-111 fired at 1600° C. (FIG. 3B). As can be seen, the new zircon article <9.41×$10^{-6}$/hr measured at 1299° C. under 1,000 psi where the old zircon article had a strain rate of >1.54×$10^{-5}$/hr measured at 1299° C. under 1,000 psi. Plus, the new zircon article had a strain rate of <1.21×$10^{-6}$/hr measured at 1250° C. under 1,000 psi. In addition, the new zircon article had a strain rate of <1.17×$10^{-6}$/hr measured at 1300° C. under 250 psi where the old zircon article had a a strain rate of >2.58×$10^{-6}$/hr measured at 1300° C. under 250 psi.

From the foregoing, one skilled in the art will appreciate that the new manufacturing process involves the counter-intuitive use of zircon decomposition and re-crystallization with a titania additive and chosen zircon particle size distribution in a formed zircon article. The manufacturing process includes firing the zircon article at a high temperature, generally above 1580° C., with a soak time of >6 hr, preferably >12 hr, more preferably >24 hr, and even more preferably >48 hr to promote the decomposition of zircon, and then very slow cooling the article, such as ≤8°/hr, and preferably ≤2°/hr, so as to promote the re-crystallization and growth of zircon crystals, decrease grain boundaries and increase grain size, as well as increase the bulk density and mechanical strength. For instance, the zircon article can have a preferred strain rate/hr of $1\times10^{-5}$/hr measured at 1300° C. under 1,000 psi and a more preferred strain rate/hr of $<1\times10^{-5}$/hr measured at 1300° C. under 1,000 psi. Plus, the zircon article can have a preferred density >3.7 g/cc and a more preferred density >4.1 g/cc.

There are several advantages associated with a zircon article that has a high creep resistance. For instance, the creep-resistant zircon article extends the overall service life of the isopipe 102, resulting in large savings. Plus, the creep-resistant article permits one to make a longer isopipe 102 that can make wider glass sheets (>Gen 10 widths) with the requisite quality of a LCD product. The new manufacturing process has an advantage in that it can be easily adopted by the current methods of making and firing a zircon isopipe. Furthermore, the new manufacturing process should lend itself to improve creep resistance in most zircon compositions with sufficient titania such as concentration >0.1% TiO2 in the batch to yield a positive macroscopic thermo-mechanical impact on the resulting zircon article.

Although one embodiment of the present solution has been illustrated in the accompanying Drawings and described in the foregoing Detailed Description, it should be understood that the solution is not limited to the disclosed embodiment, but is capable of numerous rearrangements, modifications and substitutions without departing from the solution as set forth and defined by the following claims.

The invention claimed is:

1. A creep-resistant zircon article comprising:
a zircon article that prior to a thermal decomposition and recrystallization process included at least fine zircon particles with a size <5 μm, coarse zircon particles with a median size in a range of 5 μm-100 μm, and a thermal decomposition promoter and after the thermal decomposition and recrystallization process the zircon article has a strain rate/hr of $<<2.2\times10^{-7}$/hr measured at 1180° C. under 1,000 psi.

2. The creep-resistant zircon article of claim 1, wherein the zircon article after the thermal decomposition and recrystallization process has the strain rate/hr of $<<1\times10^{-7}$/hr measured at 1180° C. under 1,000 psi.

3. The creep-resistant zircon article of claim 1, wherein the zircon article after the thermal decomposition and recrystallization process has a density >3.7 g/cc.

4. The creep-resistant zircon article of claim 1, wherein the zircon article after the thermal decomposition and recrystallization process has a density >4.1 g/cc.

5. The creep-resistant zircon article of claim 1, wherein the thermal decomposition promoter is titania.

* * * * *